United States Patent [19]

Nishioka

[11] Patent Number: 5,026,573

[45] Date of Patent: Jun. 25, 1991

[54] METHOD FOR THE PREPARATION OF LEACHED FISH FLESH AND PRODUCT THEREOF

[75] Inventor: Fujio Nishioka, Tokyo, Japan

[73] Assignee: Tokai Regional Fishery Research Laboratory, Tokyo, Japan

[21] Appl. No.: 567,684

[22] Filed: Aug. 14, 1990

Related U.S. Application Data

[63] Continuation of Ser. No. 316,245, Feb. 28, 1989, abandoned.

[30] Foreign Application Priority Data

Mar. 2, 1988 [JP] Japan .................................. 63-47521

[51] Int. Cl.⁵ ............................................. A23L 1/325
[52] U.S. Cl. .................................... 426/643; 426/437; 426/479; 426/519
[58] Field of Search ............... 426/643, 437, 417, 478, 426/479, 519

[56] References Cited

U.S. PATENT DOCUMENTS

| 3,491,080 | 1/1970 | Ehrensvard et al. ........... 426/437 X |
| 3,520,868 | 7/1970 | Henderson et al. ............ 426/437 X |
| 4,405,653 | 9/1983 | Gray ................................... 426/643 |

FOREIGN PATENT DOCUMENTS

| 46-13666 | 4/1971 | Japan ................................... 426/437 |
| 61-55938 | 11/1986 | Japan ................................... 426/643 |
| 62-55060 | 3/1987 | Japan ................................... 426/643 |

Primary Examiner—Arthur L. Corbin
Attorney, Agent, or Firm—Schmeiser, Morelle & Watts

[57] ABSTRACT

A method for the preparation of high-quality leached fish flesh having excellent gel formation ability is here disclosed which comprises first adding a leaching liquid, comprising a solution of a phosphate and/or sodium bicarbonate to fillets or chops obtained from fresh fish or frozen fish, then mashing the fish down to the level of muscle fiber by means of a homogenizer, allowing the solution containing the thus mashed fish, under a reduced pressure of 100 mmHg or less, to leach out impurities from the fish, and dehydrating the remaining fish flesh.

5 Claims, 3 Drawing Sheets

—○—: GEL BY DIRECT HEATING
—△—: GEL BY TWO-STEP HEATING

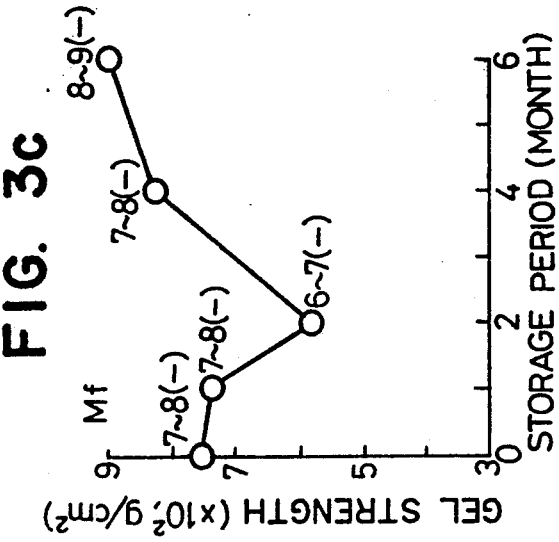
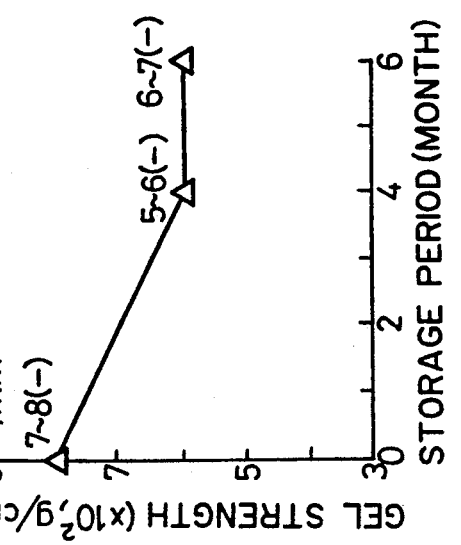
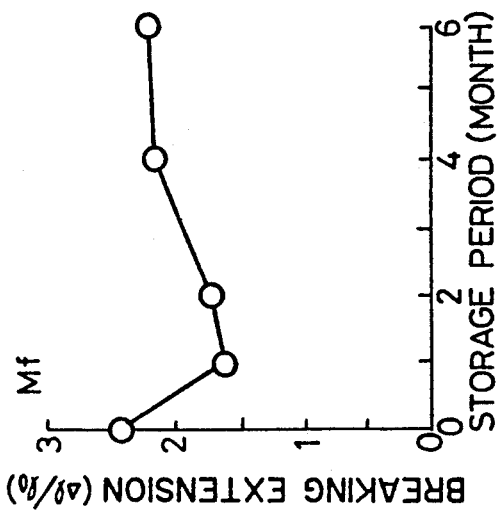
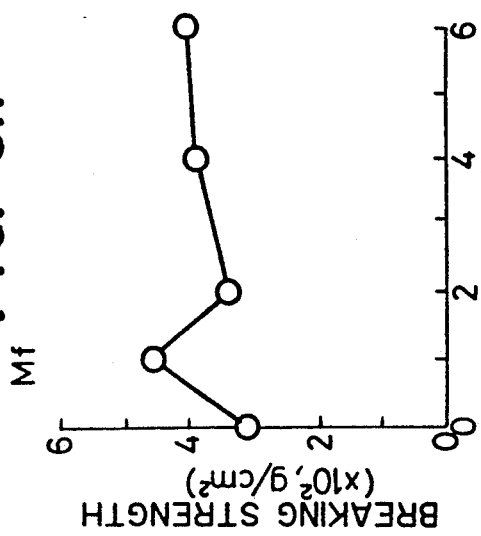
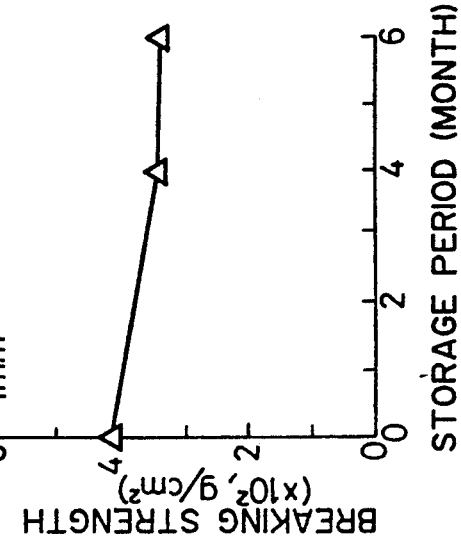

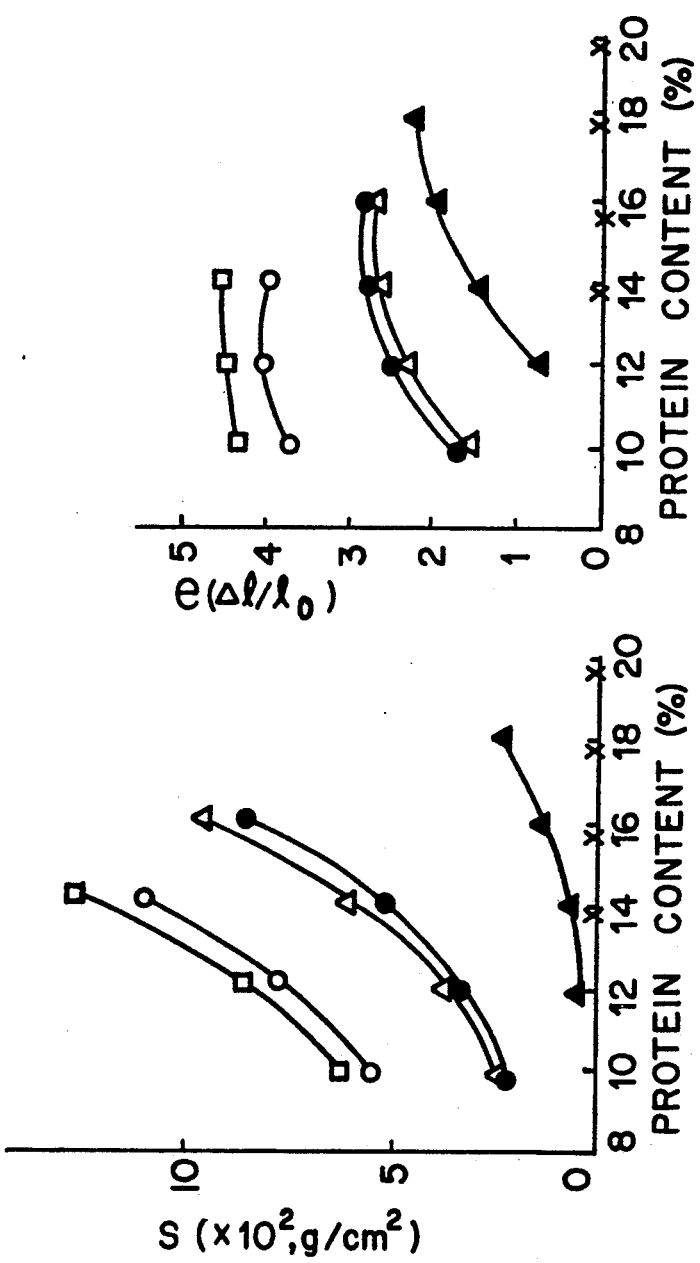

METHOD FOR THE PREPARATION OF LEACHED FISH FLESH AND PRODUCT THEREOF

This application is a continuation-in-part of application Ser. No. 316,245, filed Feb. 28, 1989, now abandoned.

BACKGROUND OF THE INVENTION

1. Field of the Invention

The present invention relates to a method for the preparation of high-quality leached fish flesh from the fish of various kinds of fresh fish and frozen fish.

2 Description of the Prior Art

In the industry of fish-paste products, the water rinsing process of fish is extremely important. The purpose of the water rinsing process is to remove dyestuff, smelling components, muscle-forming proteins and fats from the fish, but the most important purpose thereof is to improve the gel formation ability of the fish.

In the conventional water rinsing process, cold water or a cold sodium bicarbonate liquid is added to segments (3 to 8 mm$^2$) of the fish, the amount of the water or liquid being 5 to 8 times as much as that of the segments. Afterward, the immersion of the segments therein is kept up for a period of 20 to 30 minutes while stirred at times, followed by dehydration. This operation is repeated 2 to 5 times. In this case, the fish which can be used as raw material fish are limited to light flesh of fresh fish, and dark flesh and frozen fish can scarcely be utilized. The reason is that the removal ratio of the fats and dyestuffs from dark flesh is low. In the conventional technique, it is difficult to obtain the high-quality leached fish flesh from fish containing a great deal of the dark flesh and fats such as sardines and mackerel. Particularly, with regard to frozen sardines, even if light flesh thereof only is used, the improvement of the gel formation ability can barely be achieved by the conventional water rinsing process.

A process for disintegrating organic material into its main nutritional constituents of fats, proteins, salts, nucleotides and insoluble solids, and separating them for nutritional use is described in a patent issued to Ehrensvard, U.S. Pat. No. 3,491,080. This process comprises adding to organic material a solution of calcium and hydroxide ions in water, blending the mixture to extract the nutritional constituents and separating the resulting extracted constituents by centrifugation and precipitation. In the Ehrensvard process, calcium hydroxide, the source of hydroxyl ions, remains largely undissolved and it releases hydroxyl ions to the solution as the ions are consumed during the extraction. This maintains in the process, a relatively low hydroxyl ion concentration at a pH of about 11-12 and is an unsuitable pH level for the instant invention because high gel-formation ability is lost. Such a disability is readily understandable since it was not the purpose of Ehrensvard to create a product having high gel-formation ability. As will be hereinafter made apparent, the instant inventor, by a unique process of leaching fish flesh using a phospate/sodium bicarbonate solution as a leaching liquid obtains a dehydrated fish flesh which has a high gel formation ability. This process and product allows the instant inventor to produce frozen Surimi which has a sufficient gel-formation ability for the manufacture of Kamaboko, a fish jelly having a high concentration of protein.

SUMMARY OF THE INVENTION

Inventors of the present application have conducted various researches to solve the above-mentioned problems, and they have finally found that these problems can be solved by first adding a leaching liquid to fillets or chops obtained from fresh fish or frozen fish, then mashing the fish down to the level of muscle fiber by means of a homogenizer, allowing the liquid containing the thus mashed fish under a reduced pressure of 100 mmHg or less to leach out impurities from the fish, and dehydrating the remaining fish flesh. The present invention has been accomplished on the basis of this knowledge.

BRIEF DESCRIPTION OF THE DRAWINGS

FIGS. 3A-3F show changes in the gel formation ability of leached sardine fish flesh obtained by the present invention in the course of a storage period.

FIGS. 4A and 4B show the relationship of protein content with tensile strength (S) and tensile extension (e) of Kamaboko Jelly prepared from proteins of varying purity.

DETAILED DESCRIPTION OF THE PREFERRED EMBODIMENTS

Figure 1:
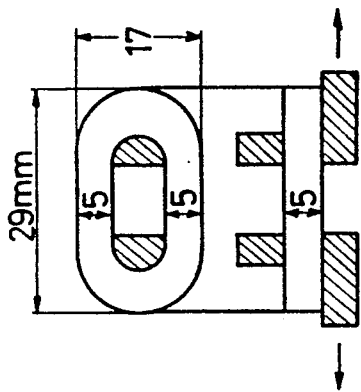
FIG. 1 is a sectional view of a piece which is used to measure the strength of a gel obtained by the present invention.

A method for the preparation of leached fish flesh according to the present invention comprises the following main steps:

(1) A step in which together with a phosphate solution, a sodium bicarbonate solution or a mixed solution of phosphate and sodium bicarbonate as a leaching liquid, raw material fish is mashed down to the level of a muscle fiber by means of a homogenizer, (2) a step in which the mashed fish-containing solution obtained in the step (1) is allowed under a reduced pressure of 100 mmHg or less to leach out impurities from the fish, and floated fats, small bones and substrate proteins are then removed therefrom, and (3) a step in which the remaining fish flesh contained in the solution coming through the step (2) is then dehydrated to prepare the desired fish flesh.

In the mashing process of the fish in the above-mentioned step (1), the leaching solution is added to fillets or chops containing dark flesh obtained from fresh fish or frozen fish in an amount of 5 to 10 times as much as that of the raw material fish. The fish in the solution is then mashed down to the level of the muscle fiber, i.e., an average size of 1 to 2 $\mu$m by means of a homogenizer such as a Waring blender or a Potter-Elvehjem homogenizer. The length of the muscle fiber is usually in the range of 10 to 100 $\mu$m, but in the present invention, this length is not particularly limited.

The concentration of the leaching solution used in the fish mashing step depends upon a kind of raw material fish and the volume of the leaching solution, but it is usually in the range of 0.05 to 0.2%.

Next, the mashed fish-containing solution thus obtained in the step (1) is subjected to the leaching step (2). That is, the mashed fish-containing solution is placed in a leaching tank equipped with a vacuum device, and it is then allowed under a reduced pressure of 100 mmHg or less, preferably 30 mmHg or less, more preferably 10 mmHg to leach out impurities from the fish. A leaching time depends upon a vacuum degree, but for example, a period of 10 to 20 minutes is preferable under a reduced pressure of 30 mmHg or less. In this leaching treatment, the solution shows a foaming phenomenon, but this is not attributable to actual boiling but the foaming of various waste components such as oxygen dissolved in the solution, a carbon dioxide gas from sodium bicarbonate in the leaching solution and volatile smelling components (e.g., amines) from the fish.

In this leaching step, when the foaming occurs, the fats are released from the muscle of the fish and float on the surface of the solution. In this case, the unmodified fats solidify in the shape of a ball or sheet, but the modified fats (oxidized fats) float thereon in a dissolved state. At this time, myoglobin particularly largely contained in the dark flesh portion is also released acceleratedly therefrom, and therefore the fish having less color is obtained.

After the leaching step, the solidified unmodified oil floating on the solution surface is removed therefrom, and then the liquid modified fats floating thereon are also removed therefrom. Afterward, the solution is passed through a sieve, while stirred, in order to remove the substrate proteins and small bones therefrom which have been mixedly present under the already removed fats. Since the sieve used in this step works to remove the substrate proteins and small bones, the mesh of the sieve should be selected in compliance with sizes of impurities present in the solution. In general, the mesh of the sieve is $1 \times 1$ mm.

The removal of the substrate proteins and small bones may be carried out prior to subjecting the mashed fish-containing solution obtained in the step (1) to the leaching step. When such a procedure is taken and when impurities are further removed from the solution after the leaching step, the removal is more effectively achieved.

Next, the mashed fish-containing solution coming through the leaching step just described is dehydrated by the use of a continuous type centrifugal hydroextractor in a usual manner, so that the desired leached fish flesh is prepared.

A waste liquid discharged through the centrifugal hydroextractor contains highly concentrated water-soluble proteins and extracts, and they can be recovered advantageously by employing a pH shift method or a membrane concentration method.

In the thus obtained leached fish flesh, a gel formation ability is high, the content of the fats is 1% by weight or less, smell is very weak, and the color due to the dark flesh is also eliminated. Therefore, the fish flesh having these advantages can be utilized as high-quality fish material. According to the present invention, even when colored sardines are used as raw material fish, the excellent frozen ground fish can be manufactured. In addition, when delicious lizardfish or croakers are employed as raw material, one leaching step is sufficient and loss of tasty components of the fish is limited. As a consequence, these kinds of fish can be frozen and stored in the summer when they are inexpensively available, and then treated to provide the leached fish flesh.

Now, the present invention will be described in detail in reference to examples.

In the undermentioned examples, the following procedures were employed for the estimation of the gel formation ability of leached fish flesh and for the quantitative determination of raw material fish, fat content, volatile basic nitrogen (VBN), ammonia nitrogen ($NH_3$-N), trimethylamine nitrogen (TMA-N) and volatile carbonyl of leached fish flesh and raw mateial fish.

Gel Formation Ability

A water content in fish was adjusted to a level of 81 to 82%, and 3% of sodium chloride was added to the fish and the latter was then ground for 15 minutes. Afterward, containers were packed with the thus ground fish, followed by direct heating (at 90° C. for 20 minutes) or two-step heating (at 35° C. for 20 minutes and at 90° C. for 20 minutes), thereby forming a gel. The strength of the thus formed gel was measured by first cutting the gel into pieces each having a size shown in FIG. 1, and then measuring breaking strength and extension strength by means of a tensile testing machine The gel formation ability was represented by the gel strength. In addition, the strength of the gel was also evaluated by a cut-off test (10 points system) and a bending test (4 steps system of $-$, $\pm$, $+$ and $++$).

Fat Content

The content of fats was quantitatively determined by drying and grinding sample fish, and then extracting fats therefrom with ether by the use of a Soxhlet's extractor.

VBN, TMA-N and $NH_3$-N

To fish was added a 0.1 M NaCl solution in an amount of 10 times as much as that of the fish, and it was ground. Afterward, proteins were removed therefrom with trichloroacetic acid to obtain a protein-free filtrate. Volatile basic nitrogen (VBN), trimethylamine (TMA) and ammonia ($NH_3$) contained in the filtrate were then quantitatively determined by a microdiffusion analysis, a picrate method and a Nessler's method, respectively.

Separation and Quantitative Determination of Volatile Carbonyl Compounds

Fish was mashed and then heated up to 40° C., and a gas was separated therefrom by a headspace method. For the separated gas, differential determination was then carried out by a gas chromatography.

EXAMPLE 1

Figure 2C:
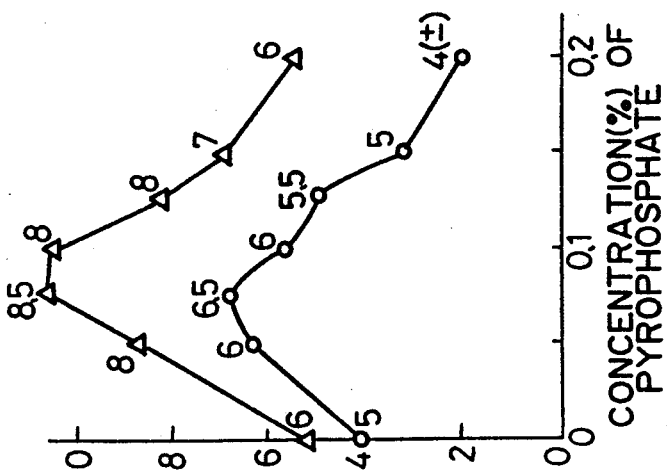
FIGS. 2A-2C show test results of the gel formation ability of sodium pyrophosphate-leached fish flesh obtained by the present invention.
Figure 2B:
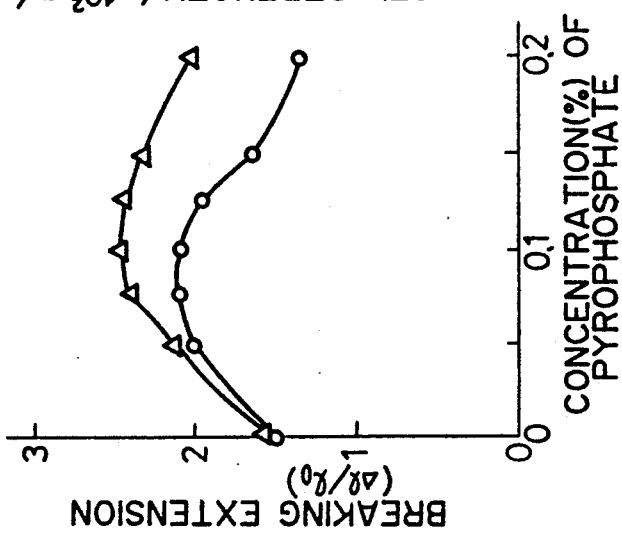
Figure 2A:
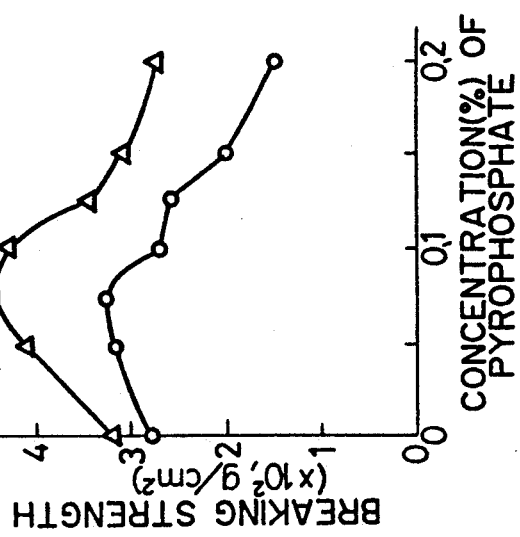

In this example, for 10 kg of sardines which had been frozen and stored at $-40°$ C. for 2 months, the effectiveness of sodium pyrophosphate leaching was tested. That is, fish samples (3 kg) containing dark flesh were taken by a fish sampling device and were then immersed separately in leaching solutions (18 kg) in which concentrations of sodium pyrophosphate varied from 0 to 0.2%, and each fish sample was mashed down to the level of a muscle fiber (average diameter = 1 to 2 $\mu$m). This mashed fish-containing solution was placed in a 30-liter leaching tank equipped with a vacuum device, and allowed under a reduced pressure of 10 mmHg for 20 minutes to leach out impurities from the fish. After the pressure in the tank was returned to the atmospheric pressure, floating fats were removed from the solution, and substrate proteins and small bones were 15 further removed therefrom by the use of a sieve (mesh = $1 \times 1$ mm). Afterward, the resultant solution was dehydrated by a centrifugal hydroextractor, thereby obtaining about 1.8 kg of the leached fish flesh. The water content in the leached fish flesh was regulated to a level of 81 to 82%, and the gel formation ability of the flesh was then inspected. The results are set forth in FIG. 2.

Measured values of breaking strength and breaking extension were greatest when the concentration of sodium pyrophosphate was in the vicinity of 0.1%, and it became apparent that the sodium pyrophosphate leaching was extremely effective. In particular, it could be elucidated that the breaking extension was at a level of 2.5 or more which was correspondent with that of a high-jelly strength fish such as lizardfish and croakers.

EXAMPLES 2 AND 3

Sardines stored in ice for 2 days after they had been caught were used to inspect the influence of fish size and leaching solutions. The results are set forth in Table 1.

The same procedure as in Example 1 was repeated with the exception that the kind and volume of a leaching solution and times of a leaching treatment were changed, in order to prepare leached fish flesh Afterward, the gel formation ability of each fish sample was measured. Incidentally, in Comparative Examples 2 and 3, the size of the fish was regulated by passing the fish through sieves having various mesh sizes when the fish were sampled by a fish sampling device.

As understood from the results of Example 2 and Comparative Example 1 in Table 1 in which leaching effects at a muscle fiber (Mf) level are given, the sodium pyrophosphate leaching effect of the present invention is much greater than the conventional alkaline solution leaching effect.

Furthermore, according to the results of Example 3 and Comparative Examples 2 and 3 in Table 1 in which a mixed solution of sodium bicarbonate and sodium pyrophosphate were used as a leaching solution and in which the size of the fish was changed, it became apparent that the smaller the size of the fish to be leached was, the greater the effect of the leaching solution.

EXAMPLE 4

The same procedure as in Example 1 was repeated with the exception that the fillets of sardines which had been stored at $-40°$ C. for 6 months were used as material fish, in order to obtain leached fish flesh Afterward, the gel formation ability of the leached flesh was inspected, and the results are set forth in FIG. 3. When a sodium pyrophosphate leaching treatment was performed at a muscle fiber (Mf) level, it could be estimated that with regard to the fish, the freezing storage period of which was 6 months or less, a gel formation ability was unchanged, and thus the fish was usable as raw material fish. However, the ground fish of 1 mm$^2$ segments did not exhibit any effect of sodium pyrophosphate. In addition, it became apparent that the longer the freezing storage period, the lower the gel formation ability.

TABLE 1

(change of gel formation ability when fish was leached under different conditions)

| | Conditions of Leaching | | | |
|---|---|---|---|---|
| | Times of Leaching Treatment | Volume of Leaching Solution (times) | kind of*$^1$ Leaching Solution | Size*$^2$ of Fish |
| Example 2 | 3 | 5 | A | Mf |
| Comp. Ex. 1 | 3 | 5 | B | Mf |
| Example 3 | 1 | 10 | C | Mf |
| Comp. Ex. 2 | 1 | 10 | C | 1 mm |
| Comp. Ex. 3 | 1 | 10 | C | 3 mm |

| | Conditions*$^3$ of Heating | Breaking Strength S(g/cm$^2$) | Breaking Extension e($\Delta l/l_o$) | Gel Strength S · e | Estimation of Jelly Strength |
|---|---|---|---|---|---|
| Example 2 | direct heating | 174 | 1.61 | 280 | 5-6 (−) |
| | two-step heating | 308 | 2.42 | 745 | 7-8 (−) |
| Comp. Ex. 1 | direct heating | 184 | 1.49 | 274 | 4-5 (±) |
| | two-step heating | 238 | 1.68 | 400 | 6-7 (−) |
| Example 3 | direct heating | 228 | 2.01 | 458 | 5-6 (−) |
| | two-step heating | 368 | 2.88 | 1060 | 8-9 (−) |
| Comp. Ex. 2 | direct heating | 179 | 1.61 | 288 | 5-6 (−) |
| | two-step heating | 324 | 2.30 | 745 | 7-8 (−) |
| Comp. Ex. 3 | direct heating | 181 | 1.36 | 246 | 3-4 (+) |
| | two-step heating | 296 | 1.85 | 548 | 6-7 (−) |

*$^1$A: 0.1% NaHCO$_3$ → 0.05% PPNa (sodium pyrophosphate) → 0.3% NaCl B: 0.1% NaHCO$_3$ → fresh water → fresh water C: 0.1% NaHCO$_3$ + 0.05% PPNa
*$^2$Mf: Muscle fiber level
*$^3$Direct heating: 90° C. for 20 minutes
Two-step heating: 35° C. for 20 minutes and 90° C. for 20 minutes

EXAMPLES 5 TO 9

The same procedure as in Example 1 was repeated with the exception that the amounts of the leaching solutions were 8 times that of the raw material fish, in order to prepare leached fish flesh. The contents of smelling components present in sardines were measured before freezing and after storage at a temperature of $-40°$ C., and the results are set forth in Table 2. In addition, the contents of the smelling components still left in the leached flesh prepared from the above-mentioned fish were also measured, and the results are set forth in Table 3. The results in these tables indicate that in the leached flesh prepared by leaching, at a muscle fiber (Mf) level, the sardines which had been frozen and stored for 3 months, contents of the smelling components which still remained therein were definitely decreased.

Furthermore, the content of fats still remaining in the leached flesh was greatly influenced by the size of the fish, and the smaller the size of the fish, the lower the content of the fats. When the size of the fish was at a muscle fiber (Mf) level, the content of the fats was lowest.

On the other hand, the content of volatile basic nitrogen (VBN) was not so affected by the size of the fish to be leached, because VBN was easily dissolved in water. However, with regard to volatile carbonyl compounds, contents of acetaldehyde and propionaldehyde were lowest when the size of the fish was at the muscle fiber (Mf) level, as shown in Table 3.

compare the gel strength of each. The test were conducted based upon the aforementioned example 1 yielding the results shown in FIG. 4.

As FIG. 4 clearly indicates, except for actin, the samples have similar tendencies wherein tensile strength increases exponentially with increase in the concentration of protein, and tensile extension increases to reach a plateau at certain levels (indicated) of protein concentration. Furthermore, regardless of the concentration of protein, both tensile strength and tensile extension drop successively according to the protein source and the following order of samples: high purity myosin > low purity myosin > muscle fiber actomyosin > minced meat > actin.

Thus, the results substantiate the inventor's contention that myosin exhibits the strongest gel-formation ability among fish proteins.

As evidenced above, in order to obtain high gel-formation ability in fish products, increasing the concentration of muscle fiber proteins is the most important factor in this method. Muscle fiber proteins comprise: myosin, which makes up the thick filaments of muscle fiber; actin, which makes up the thin filaments of muscle fiber; and, actomyosin, which is the polymerized product of myosin and actin. The activation of myosin in muscle fiber proteins is of additional importance in obtaining high gel formation. It has been realized that only by following the methodology of the instant invention can the above mentioned objects be achieved.

It has been demonstrated that it is possible to obtain fish meat having a high content of muscle fiber proteins resulting from the removal of substrate proteins, small bones and fats from fillet or chops by a leaching process

TABLE 2

(Contents of VBN, NH$_3$, TMA and fats in leached fish)

| | Sample | Size* of Fish | Leaching Conditions PPNa Conc. (%) | Times | VBN (mg/100 g) | NH$_3$-N (mg/100 g) | TMA-N (mg/100 g) | Fats (%) |
|---|---|---|---|---|---|---|---|---|
| Example 5 | fresh fish 1 | Mf | 0.05 | 5 | 1.9 | 1.7 | 0.2 | 0.9 |
| Comp. Ex. 4 | fresh fish 1 | Mtb | — | — | 20.2 | 16.2 | 1.0 | 9.1 |
| Comp. Ex. 5 | fresh fish 2 | Mtb | — | — | 16.0 | 15.5 | tr | 6.1 |
| Comp. Ex. 6 | fresh fish 2 | 1 mm | 0.1 | 5 | 2.3 | 1.6 | tr | 2.1 |
| Comp. Ex. 7 | fresh fish 2 | 3 mm | 0.2 | 5 | 2.1 | 2.1 | 0.2 | 2.5 |
| Example 6 | frozen for 1 month | Mf | 0.05 | 5 | 4.5 | 3.3 | 0.1 | 0.8 |
| Comp. Ex. 8 | frozen for 1 month | Mt | — | — | 17.2 | 13.8 | 1.4 | 7.1 |
| Example 7 | frozen for 2 months | Mf | 0.05 | 3 | 2.0 | 1.9 | tr | — |
| Example 8 | frozen for 2 months | Mf | 0.05 | 5 | 1.9 | 1.7 | 0.1 | — |
| Comp. Ex. 9 | frozen for 2 months | Mta | — | — | 21.3 | 19.8 | 0.7 | — |
| Comp. Ex. 10 | frozen for 2 months | Mtb | — | — | 21.3 | 18.2 | 2.4 | — |
| Comp. Ex. 11 | frozen for 2 months | 1 mm | 0.05 | 3 | 2.0 | 2.0 | tr | — |
| Comp. Ex. 12 | frozen for 2 months | 1 mm | 0.05 | 5 | 1.6 | 1.5 | tr | — |
| Example 9 | frozen for 3 months | Mf | 0.05 | 3 | 2.0 | 1.7 | tr | — |
| Comp. Ex. 13 | frozen for 3 months | Mta | — | — | 17.6 | 16.4 | 0.8 | — |
| Comp. Ex. 14 | frozen for 3 months | Mtb | — | — | 20.2 | 17.5 | 2.7 | — |
| Comp. Ex. 15 | frozen for 3 months | 1 mm | 0.05 | 3 | 3.2 | 2.9 | 0.1 | — |

*Mt: Fillets.
Mta: Fillets. The contents were measured after pH of the fillets was adjusted to 7.0, and the fillets were not heated.
Mtb: Fillets. The contents were measured after pH of the fillets was adjusted to 7.0, 3% of NaCl was added, and then mashed and heated at 90° C. for 20 minutes.

TABLE 3

[Contents of volatile carbonyl compounds in leached fish flesh (μg/100 g; frozen for 3 months)]

| Carbonyl Compound | Fillets (Mt) | Muscle Fiber Level (Mf) | 1 mm Ground Fish | 1 mm Ground Fish |
|---|---|---|---|---|
| Acetaldehyde | 61 | 8 | 15 | 29 |
| (Ethanol) | 2 | 4 | — | 12 |
| Propyonaldehyde | 167 | 21 | 103 | 134 |
| Isobutylaldehyde | 88 | 8 | 14 | 22 |
| n-Butylaldehyde | 20 | — | 10 | 24 |
| Isovaleraldehyde | 2 | — | 4 | 7 |
| n-Valeraldehyde | 7 | 18 | 23 | 15 |
| Isopropionaldehyde | — | — | — | — |
| n-Capronaldehyde | 2 | 2 | 2 | 16 |

EXPERIMENTAL

Using various sources of protein fiber (minced meat, muscle fiber, actomyosin, myosin and actin), all of which are prepared from the meat of dorado (Coryphaena hippurus) fish caught by conventional means, Kamaboko jellies were produced with various concentrations of protein. The different jellies were subjected to tensile strength tests and tensile extension tests to under reduced pressure using specific solutions, i.e., a phosphate solution, a sodium bicarbonate solution or a mixed solution of phosphate and sodium bicarbonate. In the fish meat having a high content of muscle fiber proteins, the tight bonds between actin and myosin (the bonds are strengthened due to post mortem rigidity) are weakened by the leaching process in order to separate the myosin from the actin; thus, the gel formation ability due to myosin is brought into full play during the mixing process with salt. In order to fully acquire the high gel formation ability, it must be borne in mind that gel formation is liable to decrease of be completely lost at any pH under 6 or over 10, or at temperatures in excess of 30° C.

The fish flesh obtained by this invention is most suitable for manufacturing high quality frozen Surimi that is to be used then in the manufacture of Kamaboko, in which a good gel formation ability is extremely important, indeed, critical. It is this factor which clearly transcends the teachings of prior art, namely those processess which generally use solutions having pH ranges either too low or too high (lower than 6 or greater than 10) to acquire the instant invention's high gel formation ability.

What is claimed is:

1. A method for the preparation of leached fish flesh having a high gel formation ability, which comprises the steps of adding a phosphate solution, a sodium bicarbonate solution or a mixed solution of phosphate and sodium bicarbonate as a leaching liquid to fillets or chops obtained from fresh fish or frozen fish, said solution having a pH of about 6 to about 10;

mashing said fish to the level of muscle fiber by means of a homogenizer, thereby producing a mashed fish-containing solution;

subjecting the resultant mashed fish-containing solution to a reduced pressure of 100 mmHg or less to leach out impurities from the fish;

then removing fats, substrate proteins and small bones from the mashed fish-containing solution in order to raise the concentration of the muscle fiber in the solution; and finally dehydrating the remaining fish flesh to obtain fish flesh containing a high concentration of muscle fiber proteins.

2. A method for the preparation of leached fish flesh according to claim 1 wherein the mashed fish-containing solution is subjected to reduced pressure of about 30 mmHg or less for ten to twenty minutes in order to leach out impurities from the fish.

3. A method for preparing leached fish flesh having a high gel formation ability, said method comprising:

adding a leaching liquid to fillets or chops obtained from fish, said leaching liquid comprising a solution of a phosphate and/or sodium bicarbonate, said solution having a pH of about 6 to about 10;

mashing said fish to the level of muscle fiber by means of a homogenizer, thereby producing a mashed fish-containing mixture;

subjecting the resultant mashed fish-containing mixture to reduced pressure of 100 mm Hg or less in order to leach out impurities from the fish;

removing fats, substrate proteins and small bones from the mashed fish-containing mixture in order to raise the concentration of muscle fiber in the mixture; and finally dehydrating the remaining fish flesh in order to obtain therein a high concentration of muscle fiber proteins.

4. The method for preparing leached fish flesh, having a high gel formation ability, according to claim 3 wherein said mashed fish-containing mixture is subjected to reduced pressure of about 30 mm Hg or less for 10-20 minutes in order to leach out impurities from the fish.

5. A product comprising leached fish flesh having a high gel formation ability, which product is prepared according to the method of claim 4 and further comprises myosin protein of 98% purity and fats at a level of 1% or lower by weight.

* * * * *